US009399829B2

United States Patent
Hidrot et al.

(10) Patent No.: US 9,399,829 B2
(45) Date of Patent: Jul. 26, 2016

(54) RUBBER COMPOSITE CORD FOR A TREAD OF A PNEUMATIC TIRE

(75) Inventors: Jean-Denis Hidrot, Clermont-Ferrand (FR); Vincent Abad, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 506 days.

(21) Appl. No.: 14/118,289

(22) PCT Filed: May 15, 2012

(86) PCT No.: PCT/EP2012/059030
§ 371 (c)(1),
(2), (4) Date: Jan. 16, 2014

(87) PCT Pub. No.: WO2012/156407
PCT Pub. Date: Nov. 22, 2012

(65) Prior Publication Data
US 2014/0205836 A1    Jul. 24, 2014

(30) Foreign Application Priority Data
May 18, 2011    (FR) ...................................... 11 54317

(51) Int. Cl.
*D02G 3/48* (2006.01)
*C08K 3/36* (2006.01)
(Continued)

(52) U.S. Cl.
CPC .............. *D02G 3/48* (2013.01); *B29C 47/0021* (2013.01); *B29C 47/027* (2013.01); *B60C 9/18* (2013.01);
(Continued)

(58) Field of Classification Search
CPC ............ D01D 5/00; D01D 5/32; D01D 5/34; D01D 5/363; D01F 8/00; D01F 8/04; D01F 8/06; D01F 8/08; D01F 8/10; D01F 8/12; D01F 8/14; D01F 8/16; D01F 8/18; Y10T 428/249938; Y10T 428/2929; Y10T 428/2931; Y10T 428/2933–428/2971; Y10T 428/2982–428/2998; D04H 1/541; D07B 1/00; D07B 1/005; D07B 1/0606; D07B 1/0613; D07B 1/062; D07B 1/0626; D07B 1/0233; D07B 1/064; D07B 1/0646; D07B 1/0653; D07B 1/066; D07B 1/0666; D07B 1/16; D07B 1/162; D07B 1/165; D07B 1/167; D07B 1/141; D07B 1/142; D07B 1/144; D07B 2205/2075–2205/2082; D07B 2801/14; D07B 2801/18; C08K 3/03; C08K 3/46; C08K 3/033; C01P 2004/60; C01P 2004/61; C01P 2004/62
USPC ........... 264/171.15, 171.24, 174.11; 442/199, 442/200, 201, 202, 361, 362, 363, 364, 365, 442/111; 428/295.1–297.1, 373, 374, 428/375–396, 323–331, 903; 977/773–777
See application file for complete search history.

(56) References Cited

U.S. PATENT DOCUMENTS 2,148,343 A    2/1939   Flautt ............................ 152/210
2,544,868 A    3/1951   Wallis
(Continued)

FOREIGN PATENT DOCUMENTS

EP    1 127 909 A1    8/2001
EP    1 392 497 B1    3/2004
(Continued)

*Primary Examiner* — Jennifer Chriss
*Assistant Examiner* — Frank Vineis
(74) *Attorney, Agent, or Firm* — Fitzpatrick, Cella, Harper & Scinto

(57) ABSTRACT

A composite cord includes a rubber core and a rubber sheath surrounding, at least in part, the rubber core. A formulation of the core is different from that of the sheath. The rubber core includes at least one diene elastomer and more than 30 phr of a filler A. The filler A includes nanoparticles having a weight-average size of less than 500 nm. The rubber sheath includes at least one diene elastomer, from 0 to less than 30 phr of a filler A', and more than 70 phr of a filler B. The filler A' includes nanoparticles having a weight-average size of less than 500 nm. The filler B includes microparticles having a weight-median size of greater than 1 μm.

29 Claims, 5 Drawing Sheets

(51) Int. Cl.

| | | |
|---|---|---|
| *C08L 7/00* | (2006.01) | |
| *B29C 47/02* | (2006.01) | |
| *C08L 21/00* | (2006.01) | |
| *B60C 9/18* | (2006.01) | |
| *B60C 11/02* | (2006.01) | |
| *B29C 47/00* | (2006.01) | |
| *B60C 11/18* | (2006.01) | |
| *B29D 30/52* | (2006.01) | |

(52) U.S. Cl.
CPC .............. *B60C 11/02* (2013.01); *B60C 11/18* (2013.01); *C08K 3/36* (2013.01); *C08L 7/00* (2013.01); *C08L 21/00* (2013.01); *B29C 2947/92333* (2013.01); *B29D 30/52* (2013.01); *C08K 2201/011* (2013.01); *Y02T 10/862* (2013.01); *Y10T 428/2918* (2015.01); *Y10T 428/2927* (2015.01)

(56) References Cited

U.S. PATENT DOCUMENTS

| | | | |
|---|---|---|---|
| 5,804,307 A | 9/1998 | Wilhelm et al. | 428/373 |
| 5,977,238 A | 11/1999 | Labauze | 524/492 |
| 6,013,718 A | 1/2000 | Cabioch et al. | 524/506 |
| 6,503,973 B2 | 1/2003 | Robert et al. | 524/492 |
| 6,774,255 B1 | 8/2004 | Tardivat et al. | 556/427 |
| 6,815,473 B2 | 11/2004 | Robert et al. | 523/215 |
| 7,208,110 B2 | 4/2007 | Lopez et al. | 264/139 |
| 7,217,751 B2 | 5/2007 | Durel et al. | 524/262 |
| 7,250,463 B2 | 7/2007 | Durel et al. | 524/492 |
| 7,300,970 B2 | 11/2007 | Durel et al. | 524/493 |
| 7,312,264 B2 | 12/2007 | Gandon-Pain | 524/236 |
| 7,488,768 B2 | 2/2009 | Tardivat et al. | 524/262 |
| 7,491,767 B2 | 2/2009 | Durel et al. | 524/493 |
| 7,820,771 B2 | 10/2010 | Lapra et al. | 525/479 |
| 7,825,183 B2 | 11/2010 | Robert et al. | 524/476 |
| 7,834,074 B2 | 11/2010 | Brunelet et al. | 524/318 |
| 7,882,874 B2 | 2/2011 | Robert et al. | 152/209.1 |
| 8,324,310 B2 | 12/2012 | Robert et al. | 524/518 |
| 8,492,475 B2 | 7/2013 | Araujo Da Silva et al. | 524/552 |
| 2003/0034104 A1 | 2/2003 | Artrip | 152/209.1 |
| 2005/0203251 A1 | 9/2005 | Oshima et al. | 525/192 |
| 2009/0186961 A1 | 7/2009 | Araujo Da Silva et al. | 523/150 |
| 2009/0209709 A1 | 8/2009 | Araujo Da Silva et al. | 525/333.1 |
| 2009/0234066 A1 | 9/2009 | Araujo Da Silva et al. | 524/571 |
| 2009/0270558 A1 | 10/2009 | Gandon-Pain et al. | 525/190 |
| 2011/0178233 A1 | 7/2011 | Chaboche et al. | 524/571 |
| 2012/0174557 A1* | 7/2012 | Boisseau | D07B 1/0613 57/213 |
| 2013/0236665 A1 | 9/2013 | Bessac | 428/34.1 |
| 2014/0044964 A1 | 2/2014 | Abad et al. | 428/378 |
| 2014/0045983 A1 | 2/2014 | Abad et al. | 524/440 |
| 2014/0051312 A1 | 2/2014 | Abad et al. | 442/149 |
| 2014/0083589 A1 | 3/2014 | Abad et al. | 152/526 |

FOREIGN PATENT DOCUMENTS

| | | | | |
|---|---|---|---|---|
| EP | 1 457 501 A1 | 9/2004 | | |
| FR | 2 740 778 A1 | 5/1997 | | |
| FR | 2 765 882 A1 | 1/1999 | | |
| FR | WO 2011000963 A2 * | 1/2011 | | D07B 1/0613 |
| GB | 506142 | 5/1939 | | |
| JP | 2001-158834 A | 6/2001 | | |
| JP | 2005-232367 A | 9/2005 | | |
| WO | 97/36724 | 10/1997 | | |
| WO | 99/16600 | 4/1999 | | |
| WO | 01/92402 A1 | 12/2001 | | |
| WO | 02/30939 A1 | 4/2002 | | |
| WO | 02/31041 A1 | 4/2002 | | |
| WO | 02/083782 A1 | 10/2002 | | |
| WO | 03/002648 A1 | 1/2003 | | |
| WO | 03/002649 A1 | 1/2003 | | |
| WO | 03/16387 A1 | 2/2003 | | |
| WO | 2004/096865 A2 | 11/2004 | | |
| WO | 2005/087859 A1 | 9/2005 | | |
| WO | 2006/061064 A1 | 6/2006 | | |
| WO | 2006/069792 A1 | 7/2006 | | |
| WO | 2006/069793 A1 | 7/2006 | | |
| WO | 2006/125532 A1 | 11/2006 | | |
| WO | 2006/125533 A1 | 11/2006 | | |
| WO | 2006/125534 A1 | 11/2006 | | |
| WO | 2007/017060 A1 | 2/2007 | | |
| WO | 2009/133068 A1 | 11/2009 | | |
| WO | WO 2011/141669 A1 | 11/2011 | | |

* cited by examiner

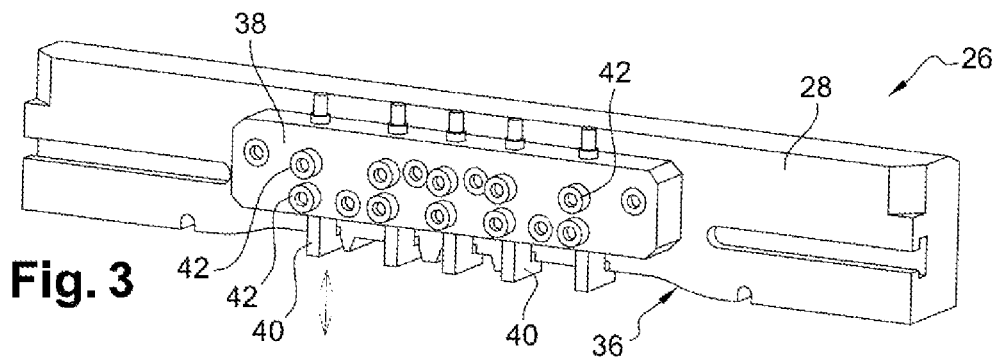
Fig. 3
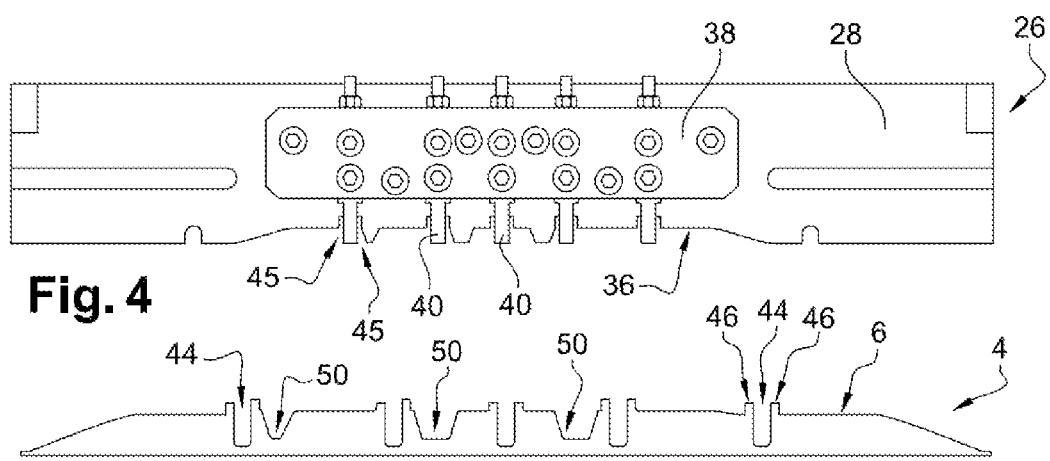
Fig. 4
Fig. 5
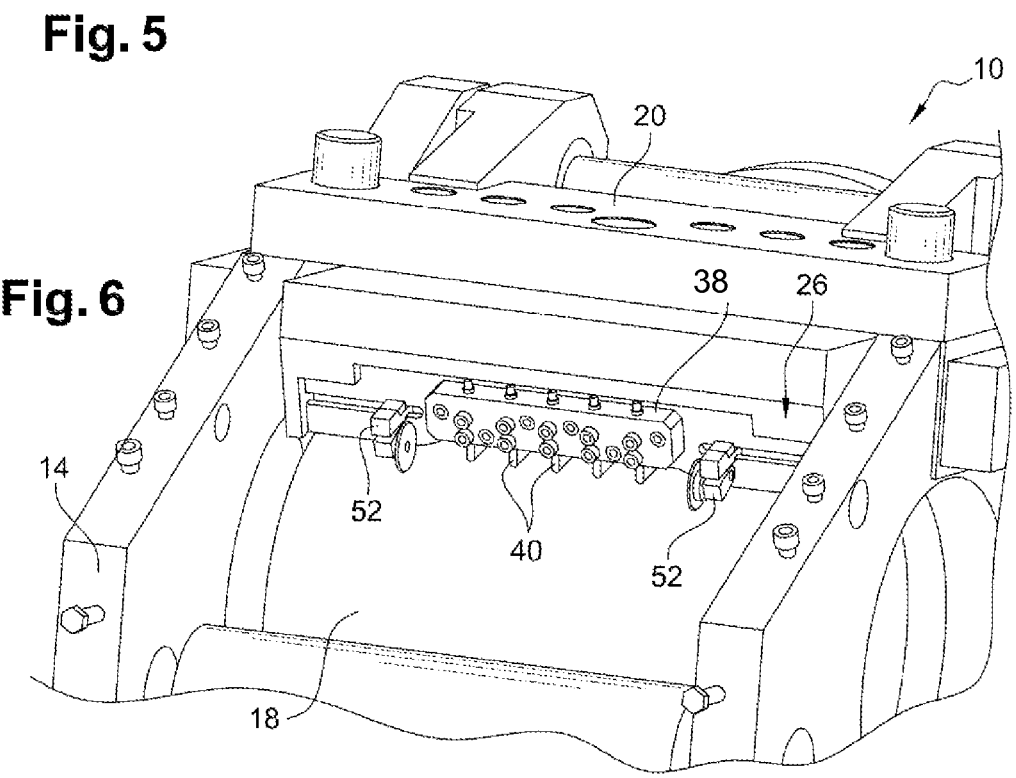
Fig. 6

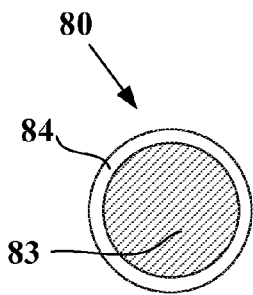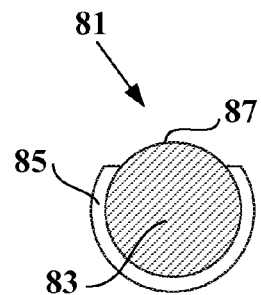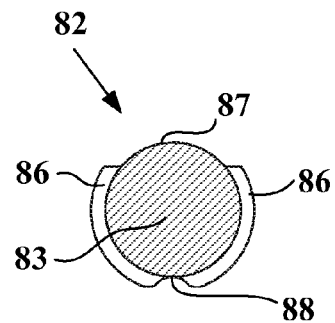
Fig. 16    Fig. 17    Fig. 18
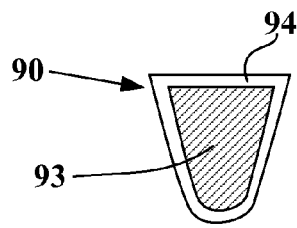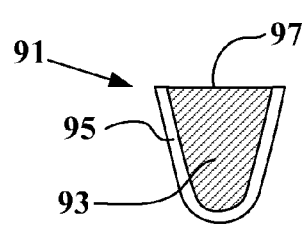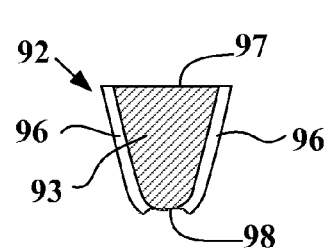
Fig. 19    Fig. 20    Fig. 21
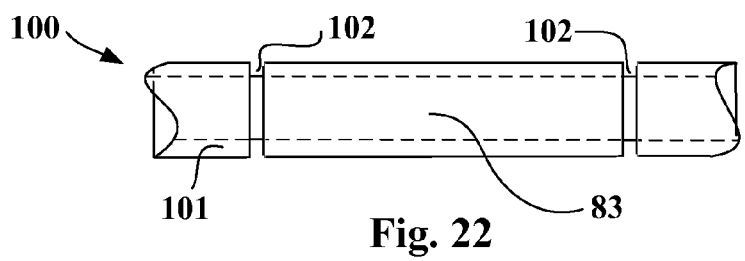
Fig. 22

RUBBER COMPOSITE CORD FOR A TREAD OF A PNEUMATIC TIRE

FIELD OF THE INVENTION

The present invention relates to pneumatic tires and more particularly to a regrooving rubber composite cord for a tread of a pneumatic tire and to a pneumatic tire, the tread of which incorporates such a regrooving rubber composite cord.

STATE OF THE ART

In the vast majority of cases, the tread patterns for pneumatic tires for heavy duty vehicles are provided with straight, zigzag or wavy circumferential grooves, it being possible for these grooves to be joined via transverse grooves and/or incisions. The circumferential grooves generally comprise wear indicators, which are small platforms of vulcanized rubber mixture covering the bottom of these grooves over a certain circumferential length, the indicator indicating the minimum depth of pattern which legally has to remain on the tread in use. Patterns for heavy duty vehicles are regroovable (operation by which fresh grooves can be hollowed out again) and the pneumatic tires having such patterns carry, on their side walls, the wording "Regroovable" or the symbol "U". The regrooving makes it possible, on the one hand, to extend the grip potential of the heavy duty vehicle pneumatic tire and, on the other hand, to significantly increase the tire life (expressed in kilometers): by 15% to 30%, as the case may be, this being achieved without damaging the possibility of retreading, which is furthermore an essential characteristic of a heavy duty vehicle pneumatic tire.

As known per se, the regrooving of a groove can be carried out using a rounded heated blade, more often handled by an operator. The said blade, connected to a frame which is supported on the tread surface, can be used manually so as to fairly reliably follow the line of the groove on the surface of the tread, even in the case of a groove not following a straight line. However, this regrooving operation requires a number of precautions. The first of them consists in carrying out the regrooving operation when approximately 2 mm of depth of groove remain, the said depth being measured between the tread surface and the radially outer surface of the wear indicators placed at the groove bottom. This precaution makes it possible to easily visualize the pattern design and thus to reproduce it without major difficulty. Knowing the remaining pattern depth and the regrooving depth recommended by the pneumatic tire manufacturer, it is then possible to adjust and set the height of the regrooving blade.

The regrooving depths generally indicated are theoretical depths. While they are, in the majority of cases, satisfactory and make it possible to theoretically set the blade height in order to obtain approximately a certain thickness of rubber between the regrooved groove bottom and the radially upper face of the crown reinforcement, the risks of excessively deep regrooving are not ruled out. In point of fact, an excessively forceful regrooving can cause damage and can compromise the possibility of an economical retreading, that is to say a retreading where only the tread is changed. It can also, in some extreme cases, reveal, at the bottom of the new grooves after regrooving, the plies of the radially underlying crown reinforcement, which is not generally allowed by the legislation in force.

In order to make it possible to carry out a regrooving which accurately keeps to the presence of a minimum thickness of rubber, above the radially outer face of the crown reinforcement, set by the pneumatic tire manufacturer, while making it possible to increase the tire life (expressed in kilometers) as much as possible, U.S. Pat. No. 6,003,576 recommends, in a pneumatic tire comprising a radial carcass reinforcement radially surmounted by a crown reinforcement formed of at least one ply of reinforcing elements, and a tread provided with grooves which can be regrooved, providing the tread parts positioned radially under the regroovable grooves with depth indicators, each indicator comprising at least one means indicating the minimum depth to be reached for effective regrooving and the maximum depth which must under no circumstances be exceeded.

The depth indicators are preferably provided in the form of incisions having a small but non zero width placed at the groove bottom, either parallel to the direction of the said groove, or perpendicular to the said direction, or both simultaneously, the means indicating the minimum and maximum depths then being the geometric shape of the bottom of the depth-indicating incision.

Although having resulted in enormous progress in the art and the way of regrooving a tread, the regrooving indicators do not remove, despite automation and extensive mechanization, the risk of passage of a cutting blade very close to the plies of the crown reinforcement; these indicators do not eliminate the human presence for the depth adjustments. Furthermore, the regrooving is carried out radially under the original grooves, designed according to a new tread thickness, and not according to a tread, the thickness of which has greatly decreased and the optimum pattern design of which is not necessarily the design conceived for the normal tread thickness.

Provision has also been made (U.S. Pat. No. 2,148,343) to incorporate, in the tread of the new pneumatic tire, a plurality of cords positioned inside the said tread in the circumferential direction. As soon as the wear of the tread reaches the cords, the latter are ejected by the centrifugal force and new grooves are thus formed.

The document EP 1 392 497 B1 provides a tread internally comprising interlayers, the external wall of which, seen in meridian cross section, has in part an outline identical to the outline of the wall of a regrooving groove to be created. The interlayers have the property of being non-sticking with the rubber mixture of the tread. These interlayers are provided with orifices in order to create, during the molding of the blank of the pneumatic tire, bridges of rubber mixture between the material of the regrooving groove to be created and the remainder of the tread. These rubber bridges prevent the ejection of the material of the regrooving groove to be created when it comes into contact with the ground by wear of the tread, while allowing it to be extracted by an operator by breaking these bridges made of rubber mixture.

However, the process for the manufacture of this tread is lengthy, complex and expensive since it is necessary in particular to successively place, in the tread blank, the interlayers and then the rubber profiled elements corresponding to the regrooving cords.

In that which follows, the term "cord" or "string" is understood to mean a rubber profiled element having an essentially constant cross section and having a width which is much greater than any other dimension and the term "regrooving cord" is understood to mean a rubber profiled element intended to be inserted in an internal cavity of a tread of a tire during manufacture and then to be withdrawn after wear of the tread in service in order to create a circumferential regrooving groove. The regrooving cord, after insertion in the tread, forms a continuous circumferential ring. This ring can be straight, zigzag or wavy, as the case may be.

BRIEF DESCRIPTION OF THE INVENTION

A subject-matter of the invention is a composite cord comprising a rubber core and a rubber sheath surrounding, at least in part, the core, the formulations of the core and of the sheath being distinct, characterized in that the said rubber core is based on at least:
one diene elastomer; and
more than 30 phr of a filler denoted A, the particles of which are nanoparticles having a (weight-) average size of less than 500 nm;
and in that the said rubber sheath is based on at least:
one diene elastomer identical to or different from the first;
from 0 to less than 30 phr of a filler A' identical to or different from the filler A, the particles of which are nanoparticles having a weight-average size of less than 500 nm; and
more than 70 phr of a filler denoted B, the particles of which are microparticles having a weight-median size of greater than 1 μm.

This composite cord can be used as regrooving cord of a tread of a pneumatic tire.

The rubber sheath makes it possible to ensure sufficient mechanical anchoring of the composite cord for it not to be ejected during running and to prevent any relative movement of the composite cord with regard to the remainder of the tread, which movement is the source of frictional actions and thus of heat dissipation at the interface.

The rubber sheath also exhibits the advantage of being able to be manually torn out without specific tooling once the cord is visible by wear of the tread of the pneumatic tire and thus of making possible easy and precise extraction of the composite regrooving cord while keeping intact the rubber core of the cord which is notably more resistant to cracks.

Preferably, each diene elastomer is selected from the group consisting of polybutadienes, natural rubber, synthetic polyisoprenes, butadiene copolymers, isoprene copolymers and the mixtures of these elastomers.

According to a preferred aspect, the filler A or the filler A' comprises carbon black.

The filler A or the filler A' can also comprise, in addition to the carbon black or as a replacement, an inorganic filler, such as silica.

Advantageously, the amount of filler A' in the rubber sheath is less than 10 phr and very preferably less than 5 phr.

Advantageously, the amount of filler B in the rubber sheath is greater than 100 phr and very preferably between 200 and 600 phr.

Advantageously, the filler B exhibits a median particle size of between 1 and 200 μm and very preferably between 5 and 100 μm.

The filler B can advantageously be selected from the group consisting of chalk, synthetic calcium carbonates, kaolin and the mixtures of such compounds.

The cords according to one embodiment of the invention are such that their greatest dimension in any cross section is between 3 and 20 mm and preferably between 5 and 15 mm.

These cord dimensions make it possible to create, after they have been removed from the tread, grooves or furrows with an axial width of between 3 and 15 mm, which gives back to the pattern of the pneumatic tire an excellent ability to discharge water when running on wet ground.

Below 3 mm, the efficiency of the cords is no longer sufficient and, above 15 mm, the gain introduced is no longer substantial.

According to one embodiment, the thickness of the rubber sheath is between 0.3 and 1.5 mm and preferably between 0.5 and 1.0 mm.

Preferably, the rubber core and the rubber sheath additionally comprise a vulcanization system and the said composite cord is non-vulcanized.

After placing the non-vulcanized composite cord in a tread cavity of a pneumatic tire blank, it is during the vulcanization operation on the pneumatic tire blank that a mechanical bond is produced between the composite cord and the remainder of the tread by interdiffusion and covulcanization. This mechanical bond of the composite cord with the remainder of the tread has the advantage of being continuous and homogeneous all around the regrooving cord.

According to another embodiment, the rubber core and the rubber sheath additionally comprising a vulcanization system, the said composite cord is prevulcanized.

The term "prevulcanized" means that the composite cord is subjected, before it is incorporated in a tread cavity of a pneumatic tire blank, to a first vulcanization or crosslinking operation sufficient to cause the composite cord to lose the plastic state characteristic of non-vulcanized rubber mixtures. The vulcanization of the composite cord is not complete in order to make possible a good mechanical bond of the rubber sheath with the adjacent tread in the pneumatic tire blank by interdiffusion and covulcanization during the vulcanization operation on the said blank.

This prevulcanized state makes it possible to retain the geometry of the regrooving cord during all the operations of incorporation in the tread, of molding and of vulcanization of the pneumatic tire blank, in particular when the rubber core comprises a butadiene copolymer.

Preferably, the rubber sheath surrounds more than 50% of the external surface of the core. The sheath can also surround all of the core.

The rubber sheath can have an open torus shape. The sheath is then made of just one part but does not completely surround the rubber core in order to leave a region of direct contact between the rubber core and the adjacent material of the tread. This contact region extends axially and promotes a good mechanical bond between the composite cord and the adjacent mixture of the tread and thus reinforces the mechanical strength of the composite cord throughout the use of the pneumatic tire before the extraction of the composite cord.

By way of example, the composite cord can have a square, rectangular or U-shaped cross-sectional outline and the rubber sheath can be positioned along three sides of the square or rectangle or the two branches and the bottom of the U.

The composite cord can also have a substantially circular cross-sectional outline.

According to another embodiment, the composite cord is such that the rubber sheath comprises two unconnected parts. The sheath is thus in two parts and leaves two regions of direct contact between the rubber core and the adjacent mixture of the tread. This embodiment reinforces the mechanical strength of the composite cord throughout the use of the pneumatic tire before the extraction of the cord.

When the composite cord has a square or rectangular or U-shaped cross-sectional outline, the rubber sheath is then preferably positioned along two opposite sides of the square or rectangle, or along the two branches of the U only. This leaves two regions of direct contact, extending axially, between the core and the mixture of the tread.

The cross section of the composite cord can be of any shape, in particular substantially circular.

The rubber sheath can also comprise axial discontinuities. This makes it possible to locally reinforce the mechanical bond of the composite cord with the adjacent material of the tread.

Another subject-matter of the invention is a pneumatic or non-pneumatic tire with a crown with a crown reinforcement surmounted by a tread, characterized in that the said tread comprises, in at least one circumferential cavity of the said tread, a composite cord as described above.

The invention relates in particular to the tires intended to equip industrial vehicles chosen from vans, "heavy-duty vehicles"—that is to say, underground, bus, heavy road transport vehicles (trucks, tractors, trailers) or off-road vehicles, such as agricultural vehicles or civil engineering equipment—or other transportation or handling vehicles. The invention can also apply to the tires of passenger motor vehicles, SUVs (Sport Utility Vehicles), two-wheel vehicles (in particular motorcycles), aircraft, and the like.

The composite cords according to the invention can be used for pneumatic tires, that is to say tires inflated with air, but also for non-pneumatic tires, that is to say tires for which the load bearing is provided structurally and non-pneumatically.

DETAILED DESCRIPTION OF THE INVENTION

In the present description, unless expressly indicated otherwise, all the percentages (%) shown are percentages by weight.

Furthermore, any interval of value denoted by the expression "between a and b" represents the range of values extending from more than a to less than b (that is to say, limits a and b excluded), whereas any interval of value denoted by the expression "from a to b" means the range of values extending from a up to b (that is to say, including the strict limits a and b).

The term "phr" is understood to mean: parts by weight per hundred parts of an elastomer.

The expression "composition based on" is understood to mean a composition comprising the mixture and/or the reaction product of the various constituents used, some of these base constituents being capable of reacting or intended to react with one another, at least in part, during the various phases of manufacture of the composition, in particular during the manufacture and the crosslinking or vulcanization thereof.

Measurements and Tests Used

Characterization of the Fillers

The (weight-)average size of the nanoparticles, denoted $d_W$, is measured conventionally after dispersion, by deagglomeration with ultrasound, of the filler to be analyzed in water or an aqueous solution comprising a surfactant.

For an inorganic filler, such as silica, the measurement is carried out using an XDC (X-rays Disc Centrifuge) X-ray detection centrifugal sedimentometer, sold by Brookhaven Instruments, according to the following procedure. A suspension of 3.2 g of sample of inorganic filler to be analyzed in 40 ml of water is produced by the action, lasting 8 minutes, at 60% power (60% of the maximum position of the "output control"), of a 1500 W ultrasound probe (Vibracell ¾ inch sonicator, sold by Bioblock); after sonication, 15 ml of the suspension are introduced into the rotating disc; after sedimentation for 120 minutes, the weight distribution of the particle sizes and the weight-average size of the particles $d_W$ are calculated by the XDC sedimentometer software ($d_W = \Sigma(n_i \times d_i^5)/\Sigma(n_i \times d_i^4)$ with $n_i$ the number of objects of the size or diameter class $d_i$).

For carbon black, the procedure was carried out with an aqueous solution comprising 15% of ethanol and 0.05% of a nonionic surfactant (% by volume). The determination is carried out using a centrifugal photosedimentometer of DCP type (Disc Centrifuge Photosedimentometer, sold by Brookhaven Instruments). A suspension of 10 mg of carbon black is prepared beforehand in 40 ml of an aqueous solution comprising 15% of ethanol and 0.05% of a nonionic surfactant (% by volume) by the action, lasting 10 minutes, at 60% power (i.e., 60% of the maximum position of the "tip amplitude"), of a 600 W ultrasound probe (Vibracell ½ inch sonicator, sold by Bioblock). During the sonication, a gradient composed of 15 ml of water (comprising 0.05% of a nonionic surfactant) and 1 ml of ethanol is injected into the rotating disc of the sedimentometer at 8000 revolutions/min, in order to form a "step gradient". Subsequently, 0.3 ml of the carbon black suspension is injected at the surface of the gradient; after sedimentation lasting 120 min, the weight distribution of the particle sizes and the weight-average size $d_W$ are calculated by the sedimentometer software, as indicated above.

With regard to the measurement of the size of the microparticles (non-reinforcing particles), use may simply be made of an analysis of the particle size by mechanical sieving. The operation consists in sieving a defined amount of sample (for example 200 g) on a vibrating table for 30 min with different sieve diameters (for example, with a series of 10 to 15 mesh sizes gradually varying from 5 to 300 µm); the oversize collected on each sieve is weighed on a precision balance; the % of oversize for each mesh diameter, with respect to the total weight of product, is deduced therefrom; the weight-median size (or apparent median diameter) is finally calculated in a known way from the histogram of the particle size distribution.

Tensile Tests

These tests make it possible to determine the elasticity stresses and the properties at break of the rubber mixtures. Unless otherwise indicated, they are carried out in accordance with French Standard NF T 46-002 of September 1988. The nominal secant moduli (or apparent stresses, in MPa) are measured in second elongation (i.e., after an accommodation cycle at the extension rate provided for the measurement itself) at 10% elongation (denoted M10). The nominal stresses (in MPa) and the elongations at break (EB in %) are also measured. All these tensile measurements are carried out under the standard conditions of temperature (23±2° C.) and hygrometry (50±5% relative humidity), according to French Standard NF T 40-101 (December 1979).

Conditions for the Implementation of the Invention

The rubber composite cord according to a subject-matter of the invention has the essential characteristic of comprising a rubber core based on at least one diene elastomer to and more than 30 phr of a filler A, the particles of which are nanoparticles having a weight-average size of less than 500 nm, and a rubber sheath based on at least one diene elastomer identical to or different from the first, from 0 to less than 30 phr of filler A' and more than 70 phr of a filler B, the particles of which are microparticles having a weight-median size of greater than 1 µm.

It may also be said that the core of the rubber composite cord comprises at least one diene elastomer and more than 30 phr of a filler A composed of nanoparticles and that the rubber sheath comprises at least one diene elastomer, from 0 to less than 30 phr of filler A' and more than 70 phr of filler B.

Diene Elastomer

The term "diene elastomer" or "diene rubber" should be understood as meaning, in a known way, an (one or more is understood) elastomer resulting at least in part (i.e., a homopolymer or a copolymer) from diene monomers (monomers bearing two conjugated or non-conjugated carbon-carbon double bonds).

Each diene elastomer of the rubber core and of the rubber sheath is preferably selected from the group of the highly unsaturated diene elastomers consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

Suitable in particular are polybutadienes having a content (molar %) of 1,2-units of between 4% and 80% or those having a content (molar %) of cis-1,4-units of greater than 80%, polyisoprenes, butadiene/styrene copolymers and in particular those having a Tg (glass transition temperature, measured according to ASTM D3418) between 0° C. and −70° C. and more particularly between −10° C. and −60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −25° C. and −50° C.

In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/styrene/isoprene copolymer having a Tg of between −20° C. and −70° C., are suitable in particular.

According to a specific embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the diene elastomer is predominantly (preferably for more than 50 phr) an isoprene elastomer. The term "isoprene elastomer" is understood to mean, in a known way, an isoprene homopolymer or copolymer, in other words a diene elastomer selected from the group consisting of natural rubber (NR), synthetic polyisoprenes (IRs), the various copolymers of isoprene and the mixtures of these elastomers. Mention will in particular be made, among the isoprene copolymers, of isobutene/isoprene copolymers (butyl rubber—IIR), isoprene/styrene copolymers (SIRs), isoprene/butadiene copolymers (BIRs) or isoprene/butadiene/styrene copolymers (SBIRs). This isoprene elastomer is preferably natural rubber or a synthetic cis-1,4-polyisoprene; use is preferably made, among these synthetic polyisoprenes, of the polyisoprenes having a content (molar %) of cis-1,4-bonds of greater than 90%, more preferably still of greater than 98%.

According to another preferred embodiment of the invention, the rubber core and/or the rubber sheath comprise(s) a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably selected from the group consisting of S-SBRs, E-SBRs, natural rubber, synthetic polyisoprenes (exhibiting a content (molar %) of cis-1,4-enchainments preferably of greater than 95%), BIRs, SIRs, SBIRs and the mixtures of these elastomers. The low Tg elastomer preferably comprises butadiene units according to a content (molar %) at least equal to 70%; it preferably consists of a polybutadiene (BR) exhibiting a content (molar %) of cis-1,4-enchainments of greater than 90%.

According to another specific embodiment of the invention, the composition of the rubber core and/or of the rubber sheath comprises, for example, from 30 to 100 phr, in particular from 50 to 100 phr, of a high Tg elastomer as a blend with 0 to 70 phr, in particular from 0 to 50 phr, of a low Tg elastomer; according to another example, it comprises, for the whole of the 100 phr, one or more SBR(s) prepared in solution or in emulsion.

According to another specific embodiment of the invention, the diene elastomer of the compositions of the core and/or of the sheath comprises a blend of a BR (as low Tg elastomer) exhibiting a content (molar %) of cis-1,4-enchainments of greater than 90% with one or more S-SBRs or E-SBRs (as high Tg elastomer(s)).

The compositions formulated according to the invention can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

The elastomers can have any microstructure which depends on the polymerization conditions used, in particular on the presence or absence of a modifying to and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in FR 2 740 778 or U.S. Pat. No. 6,013,718), of alkoxysilane groups (such as described, for example, in FR 2 765 882 or U.S. Pat. No. 5,977,238), of alkoxysilane groups bearing an amine group (such as described, for example, in US 2005/0203251, JP 2001158834, JP 2005232367, EP 1 457 501 A1 or WO 09/133,068), of carboxyl groups (such as described, for example, in WO 01/92402 or U.S. Pat. No. 6,815,473, WO 2004/096865 or US 2006/0089445) or of polyether groups (such as described, for example, in EP 1 127 909 or U.S. Pat. No. 6,503,973). Mention may also be made, as other examples of functionalized elastomers, of the elastomers (such as SBR, BR, NR or IR) of the epoxidized type.

When the diene elastomer is natural rubber, the latter may have been subjected to a physical or chemical modification or treatment directly on its production site or also subsequently, before or during the preparation of the rubber composition. These operations are well known to a person skilled in the art and can, by way of example, consist of an enzymatic treatment or a chemical modification by addition of specific compounds.

Filler A

The composite cord according to a subject-matter of the invention has the essential characteristic of comprising, on the one hand, a rubber core with more than 30 phr of reinforcing filler A and, on the other hand, a rubber sheath with from 0 to less than 30 phr of reinforcing filler A'.

Use may be made of any type of reinforcing filler known for its abilities to reinforce a rubber composition which can be used for the manufacture of tire treads, for example an organic filler, such as carbon black, a reinforcing inorganic filler, such as silica, or also a blend of these two types of filler, in particular a blend of carbon black and silica.

All carbon blacks are suitable as carbon blacks, in particular the blacks conventionally used in the treads of tires ("tire-grade" blacks). Among the latter, mention will be more particularly be made of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example N660, N683 or N772). The carbon blacks might, for example, be already incorporated in the elastomer in the form of a masterbatch (see, for example, Application WO 97/36724 or WO 99/16600).

Mention may be made, as examples of organic fillers other than carbon blacks, of functionalized polyvinylaromatic organic fillers, such as described in Applications WO-A-2006/069792 and WO-A-2006/069793.

The term "reinforcing inorganic filler" should be understood as meaning, in the present patent application, by definition, any inorganic or mineral filler (whatever its color and its origin (natural or synthetic)), also known as "white" filler, "clear" filler, indeed even "non-black" filler, in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of balls or any other appropriate densified form. Of course, the term "reinforcing inorganic filler" is also understood to mean mixtures of different reinforcing inorganic fillers, in particular of highly dispersible siliceous and/or aluminous fillers as described below.

Suitable in particular as reinforcing inorganic fillers are mineral fillers of the siliceous type, in particular silica ($SiO_2$), or of the aluminous type, in particular alumina ($Al_2O_3$). The silica used can be any reinforcing silica known to a person skilled in the art, in particular any precipitated or fumed silica exhibiting a BET specific surface and a CTAB specific surface which are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas having a high specific surface as described in Application WO 03/16387.

The reinforcing inorganic filler used, in particular if it is silica, preferably has a BET specific surface of between 45 and 400 $m^2/g$, more preferably of between 60 and 300 $m^2/g$.

Preferably, for the rubber core, the total content of reinforcing filler A (carbon black and/or reinforcing inorganic filler, such as silica) is greater than 30 phr and preferably between 40 and 100 phr; this makes it possible to provide the rubber core of the composite cord with good resistance to cracking while retaining a low hysteresis.

Preferably, for the rubber sheath, the total content of reinforcing filler A' is less than 10 phr, more preferably between 2 and 5 phr. This makes it possible to provide the rubber sheath with good behavior in the raw state, without conferring significant tensile strength.

Preferably, the (weight-)average size of the nanoparticles is between 20 and 200 nm, more preferably between 20 and 150 nm.

Use is made, in a known way, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" according to their specific structure, such as described, for example, in Applications WO 03/002648 (or US 2005/016651) and WO 03/002649 (or US 2005/016650).

Suitable in particular, without the definition below being limiting, are silane polysulphides known as "symmetrical", corresponding to the following general formula (I):

Z-A-$S_x$-A-Z, in which: (I)

x is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

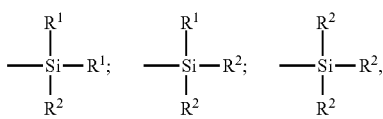

in which:
the $R^1$ radicals, which are substituted or unsubstituted and identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl group or a $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

Mention will more particularly be made, as examples of silane polysulphides, of bis(3-trimethoxysilylpropyl) or bis (3-triethoxysilylpropyl)polysulphides. Use is in particular made, among these compounds, of bis(3-triethoxysilylpropyl)tetrasulphide, abbreviated to TESPT, or bis(triethoxysilylpropyl)disulphide, abbreviated to TESPD. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in Patent Application WO 02/083782 (or US 2004/132880).

Mention will in particular be made, as coupling agent other than an alkoxysilane polysulphide, of bifunctional POSs (polyorganosiloxanes) or else of hydroxysilane polysulphides ($R^2$=OH in the above formula I), such as described in Patent Applications WO 02/30939 (or U.S. Pat. No. 6,774, 255) and WO 02/31041 (or US 2004/051210), or else of silanes or POSs carrying azodicarbonyl functional groups, such as described, for example, in Patent Applications WO 2006/125532, WO 2006/125533 and WO 2006/125534.

In the rubber core compositions according to a subject-matter of the invention, the content of coupling agent is preferably between 4 and 12 phr, more preferably between 3 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

Filler B

The rubber sheath of the composite cord has the second essential characteristic of comprising, as non-reinforcing filler (denoted filler B), more than 70 phr of microparticles having a (weight-)average size of greater than 1 μm.

Below the above minima, both for the content and for the size of the microparticles, the targeted technical effect is not obtained; an excessively high resistance to cracking is then observed for the rubber sheath of the composite cord and an operator can no longer withdraw the regrooving cord from its cavity without a specific tool.

The content of microparticles is preferably greater than 100 phr, more preferably between 200 and 600 phr, and their median size is preferably between 1 and 200 μm, more particularly between 5 and 100 μm. Above the maxima indicated, both for the content and for the size of the microparticles, a risk arises of insufficient cohesion in service of the rubber sheath, which may then no longer guarantee in service good continuous and homogeneous anchoring of the regrooving cord in the cavity of the tread.

For all the reasons indicated above, the content of the microparticles is more preferably between 300 and 500 phr and their median size is more preferably between 10 and 50 μm.

The non-reinforcing fillers which can be used as filler B are known to a person skilled in the art; mention will in particular be made of:
natural calcium carbonates (chalk), synthetic calcium carbonates, natural silicates (kaolin, talc, mica), ground silicas, aluminas, silicates or aluminosilicates;
biodegradable compounds, such as polyesteramide, starch, polylactic acid or cellulose derivatives (for example, cellulose acetate or lignin).

More preferably, use is made of microparticles of filler B selected from the group consisting of chalk, synthetic calcium carbonates, kaolin and the mixtures of such compounds.

Mention may be made, as examples of such preferred and commercially available fillers B, for example, of the chalk sold under the name "Omya BLS" by Omya and the kaolins sold under the name "Polwhite KL" by Imerys.

Various Additives

The compositions of the rubber core and of the rubber sheath can also comprise all or a portion of the usual additives generally used in elastomer compositions intended for the manufacture of tires, such as, for example, pigments, protection agents, such as antiozone waxes, chemical antiozonants or antioxidants, antifatigue agents, reinforcing resins, methylene acceptors (for example, phenolic novolac resin) or methylene donors (for example, HMT or H3M), such as described, for example, in Application WO 02/10269, a crosslinking system based either on sulphur, or on sulphur donors and/or on peroxide and/or on bismaleimides, vulcanization accelerators or vulcanization activators.

The addition of pigments has the advantage of clearly indicating when the level of wear reaches the regrooving cord.

The rubber core can also comprise, in addition to the coupling agents, coupling activators, covering agents for the inorganic fillers or more generally processing aids to capable, in a known way, by virtue of an improvement in the dispersion of the filler in the rubber matrix and of a lowering in the viscosity of the compositions, of improving their ease of processing in the raw state, these agents being, for example, hydrolysable silanes, such as alkylalkoxysilanes, polyols, polyethers, primary, secondary or tertiary amines or hydroxylated or hydrolysable polyorganosiloxanes.

The rubber core can also comprise, as preferred non-aromatic or very weakly aromatic plasticizing agent, at least one compound selected from the group consisting of naphthenic oils, paraffinic oils, MES oils, TDAE oils, ester plasticizers (for example, glycerol trioleates), hydrocarbon resins exhibiting a high Tg preferably of greater than 30° C., such as described, for example, in Applications WO 2005/087859, WO 2006/061064 and WO 2007/017060, and the mixtures of such compounds. The overall content of such a preferred plasticizing agent is preferably between 10 and 100 phr, more preferably between 20 and 80 phr, in particular within a range from 10 to 50 phr.

Mention will in particular be made, among the above plasticizing hydrocarbon resins (it should be remembered that the name "resin" is reserved by definition for a solid compound), of α-pinene, β-pinene, dipentene, polylimonene or $C_5$ fraction homo- or copolymer resins, for example $C_5$ fraction/styrene copolymer resin or $C_5$ fraction/$C_9$ fraction copolymer resin, which can be used alone or in combination with plasticizing oils, such as, for example, MES or TDAE oils.

DESCRIPTION OF THE FIGURES

The appended figures illustrate a machine for producing a tread with incorporated regrooving cord and also such treads:

FIGS. 3 and 4 are two views, respectively in perspective and from the front, of the blade of the machine of FIG. 1;

FIG. 5 is a sectional view of the tread obtained by passing under the blade of FIG. 3;

FIG. 6 is a view analogous to FIG. 1 showing the positioning of the blade of FIG. 3 on the machine;

FIGS. 16 to 18 exhibit embodiments of composite cords having circular cross sections;

FIGS. 19 to 21 exhibit embodiments of composite cords having U-shaped cross sections; and FIG. 22 exhibit another embodiment of a composite cord.

EXAMPLES OF THE IMPLEMENTATION OF THE INVENTION

Manufacture of the Composite Cord

Figure 1:
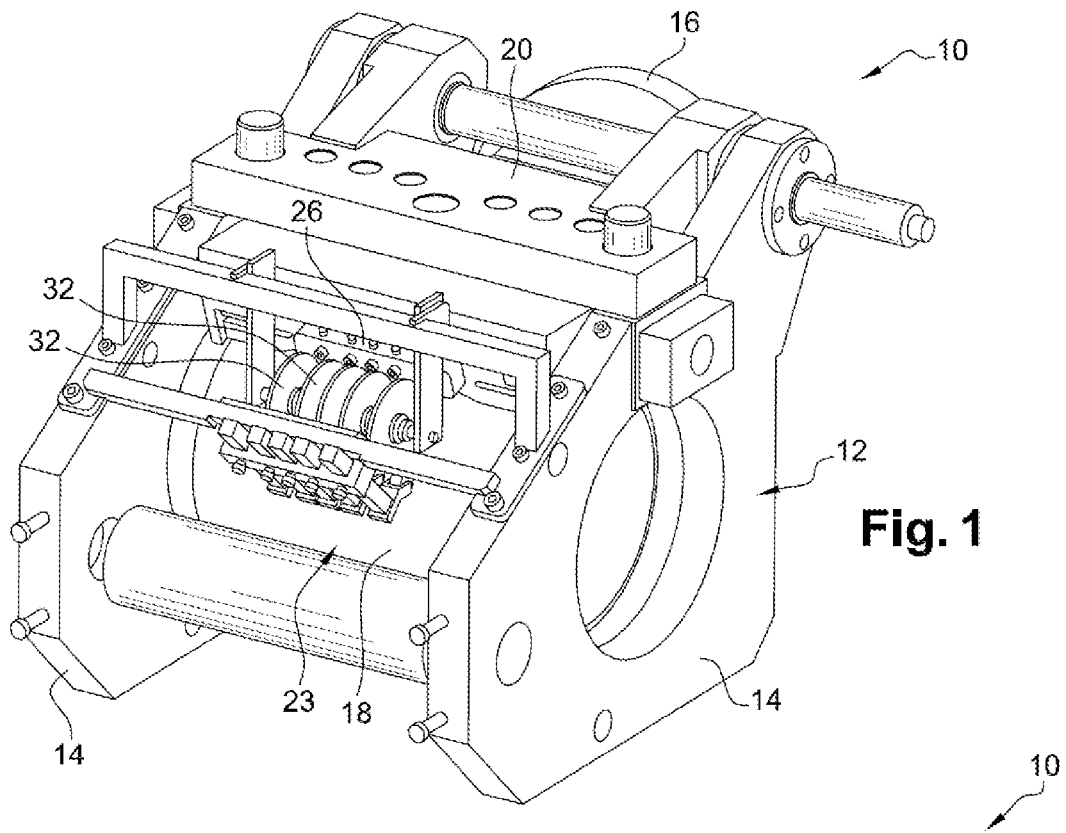
FIGS. 1 and 2 are two views, respectively in perspective and in vertical cross section, of a nose of a machine for producing a tread with regrooving cord.

The compositions of the rubber core and of the rubber sheath are manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing a composition of the rubber core and/or of the rubber sheath comprises, for example, at least the following stages:

incorporating, in a diene elastomer, during a first stage ("non-productive" stage), the filler or fillers, everything being kneaded thermomechanically, in one or more goes, until a maximum temperature of between 110° C. and 190° C. is reached;

cooling the combined mixture to a temperature of less than 100° C.;

subsequently incorporating, during a second stage ("productive" stage), the crosslinking system;

kneading everything up to a maximum temperature of less than 110° C.

By way of example, the non-productive phase is carried out in a single thermomechanical stage during which, in a first step, all the necessary base constituents (diene elastomer, fillers and coupling agent, if necessary, plasticizing system) are introduced into an appropriate mixer, such as a standard internal mixer, followed, in a second step, for example after kneading for one to two minutes, by the other additives, optional additional covering agents or processing aids, with the exception of the crosslinking system. The total duration of the kneading, in this non-productive phase, is preferably between 1 and 15 min.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The crosslinking system is preferably a vulcanization system based on sulphur and on an accelerator. Use may be made of any compound capable of acting as accelerator of the vulcanization of diene elastomers in the presence of sulphur, in particular of those selected from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI") and the mixtures of these compounds. Preferably, a primary accelerator of the sulphenamide type is used.

Additional to this vulcanization system may be various known secondary vulcanization accelerators or vulcanization activators, such as zinc oxide, stearic acid, guanidine derivatives (in particular diphenylguanidine), and the like, incorporated during the first non-productive phase and/or during the productive phase. The sulphur content is, for example, between 0.5 and 3.0 phr and that of the primary accelerator is between 0.5 and 5.0 phr.

The final compositions of the rubber core and of the rubber sheath can subsequently be calendered, for example in the form of sheets or plaques. These intermediate products are subsequently extruded in one or more operations and preferably coextruded in one operation, to give the final geometry of the composite cord, suited to its incorporation in a cavity of a pneumatic tire tread. The composite cords can then be wound around spools.

The cords described above can be used to be positioned in any tread internal cavity of pneumatic tires for a motor vehicle, such as a vehicle of two-wheel, passenger or industrial type.

FIG. 16 exhibits a sectional view of a first embodiment of a cord 80 having a circular section. This composite cord comprises a core 83 having a substantially circular cross section and a sheath 84. The sheath 84 completely surrounds the core 83. The diameter of the core 83 is of the order of 3 to 10 mm and the thickness of the sheath 84 is between 0.3 and 1.5 mm, preferably between 0.5 and 1.0 mm.

FIG. 17 exhibits a second embodiment of a composite cord 81 having a substantially circular section. In this embodiment, the sheath 85, made of a single part, does not completely surround the core 83 but leaves a region 87 of the periphery of the core 83 free. The region 87 extends axially over all or part of the length of the composite cord 81. Consequently, after insertion of the composite core in a tread cavity, this part 87 will be in direct contact with the adjacent mixture of the tread and will be able to strongly bond to this mixture by interdiffusion and covulcanization. This reinforces the endurance of the bond between the composite cord and the mixture of the tread in service.

FIG. 18 exhibits a composite cord 82 having a substantially circular section. The sheath 86 of this composite cord 82 is made of two parts which do not completely surround the core 83 and leave two regions 87 and 88 free. The two regions 87 and 88 extend axially over all or part of the composite cord 82. As in the case of the composite cord 81, the two free regions reinforce the endurance in service of the bond between the composite cord and the mixture of the tread. The two regions 87 and 88 are preferably axially opposite.

FIG. 19 exhibits another embodiment of a composite cord 90, the section of which is U-shaped. This composite cord 90 comprises a core 93 comprising a substantially U-shaped cross section and a sheath 94. The sheath 94 completely surrounds the core 93. The height of the two branches of the U is of the order of 5 to 12 mm and the distance between the top of the two branches of the U is also of the order of 5 to 12 mm. The thickness of the sheath 94 is of the order of 0.3 to 1.5 mm and preferably between 0.5 and 1.0 mm.

FIG. 20 exhibits a second embodiment of a composite cord 91 having a substantially U-shaped section. In this embodiment, the sheath 95, made of a single part, does not completely surround the core 93 but leaves a region 97 of the periphery of the core 93 free. The sheath 95 extends over both branches of the U and the bottom of the U. The region 97 extends axially over all or part of the length of the composite cord 91. The part 97 makes it possible to reinforce the endurance of the bond between the composite cord and the mixture of the tread in service. This sheath-free part 97 is preferably positioned radially in the most external fashion in the cavity of the tread.

FIG. 21 exhibits a composite cord 92 comprising a substantially U-shaped section. The sheath 96 of this composite cord 92 is made of two parts which do not completely surround the core 93 and leave two regions 97 and 98 free. The two parts of the sheath 96 in this instance extend along the two branches of the U. The two regions 97 and 98 extend axially over all or part of the composite cord 92. As in the case of the composite cord 91, the two free regions reinforce the endurance in service of the bond between the composite cord and the mixture of the tread. The two regions 97 and 98 are axially opposite.

FIG. 22 exhibits a composite cord 100 in side view. This composite cord comprises a core 83 of substantially circular cross section, by way of illustration, and also a rubber sheath 101. The sheath 101 does not extend axially over the entire length of the composite cord 100 but is interrupted now and again to leave free regions 102 at the surface of the core 83. These regions 102 make possible direct contact between the core to and the adjacent mixture of the tread of the pneumatic tire. In the example of the composite cord 100, the regions 102 go round the core 83.

Of course, any axial and circular combination of the free regions 87, 88, 97, 98 and 102 is possible. Other cross-sectional forms of the cords are also possible.

Manufacture of a Tread with Composite Cord

According to a first embodiment known per se, a tread with composite cord incorporated in one or more cavities is produced by co-extrusion. The cords and the tread in which they are embedded are thus extruded together.

According to a second embodiment:
a rubber tread is extruded;
at least one furrow is formed in the tread;
at least one composite cord is provided from a spool; and
the composite cord is inserted into the or each furrow.

The cords are produced as indicated above prior to the formation of the rubber tread and separately from the latter. It is then sufficient to position them in the furrow and to close the latter. The cords are thus buried in the rubber subsequent to the formation thereof. This process limits the amount of scrap from manufacturing failings due to the fact that it makes it possible to dispense with the stages of stabilization of the process at the start-up of each manufacturing series.

Preferably, for each section of the tread, the section is extruded and the furrow is formed in the section simultaneously.

A description will now be given, with reference to FIGS. 1 to 14, of an embodiment of a machine which is, in the case in point, an extrusion machine used for producing a tread for the manufacture of a vehicle pneumatic tire green blank.

Figure 15:
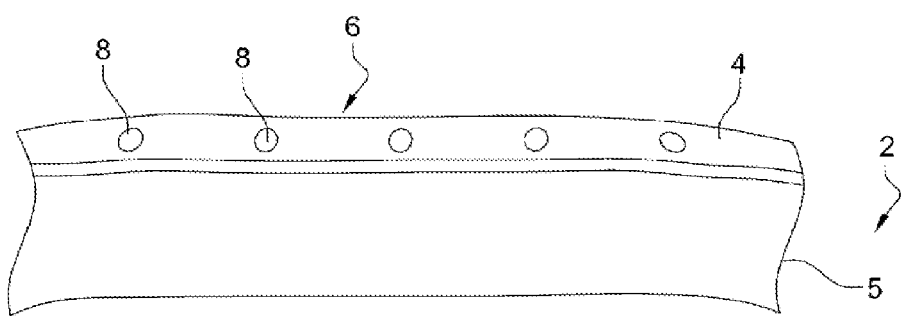
FIG. 15 is a view in cross section of the tread of the pneumatic tire manufactured by means of the machine.

An illustration has been given, in FIG. 15, of a portion 2 of a cross section of a pneumatic tire resulting from this manufacturing operation after vulcanization of the blank, the cross section being taken in a radial plane with reference to an axis of rotation 3 of the pneumatic tire. The tread 4 extends in the periphery of the pneumatic tire between the sidewalls of the latter and over its carcass 5, in the periphery of the latter. The tread 4 exhibits an external peripheral face 6 forming the surface via which the pneumatic tire will be in contact with the ground. This face has a cylindrical general shape of circular cross section.

The tread 4 comprises a main body formed of rubber, which conventionally comprises a mixture of natural and synthetic elastomers and various products and adjuvants.

The tread 4 additionally comprises several cords or strings 8 which are, in the case in point, five in number, this number not being limiting. The cords each have a wire form, with a circular cross section, as in the case in FIGS. 7, 11 and 15, or a square cross section, as in the case of FIGS. 8 and 12. The cords are embedded in the body and extend at a distance from the two main external and internal faces of the tread. Each composite cord forms a circle coaxial with the pneumatic tire and extends in a plane perpendicular to the axis 3. The cords can have identical or different transverse profiles and can be composed of identical or different materials. The cords are produced individually, beforehand and separately from the tread 4, and are then wound onto spools 9 (see FIG. 2) which are subsequently brought to the machine.

The nose 10 of the extrusion machine comprises a frame 12 comprising two vertical uprights 14 of planar form positioned in parallel to one another and facing and at a distance from one another. The majority of the devices of the nose extend in the space provided between the two uprights 14.

Figure 2:
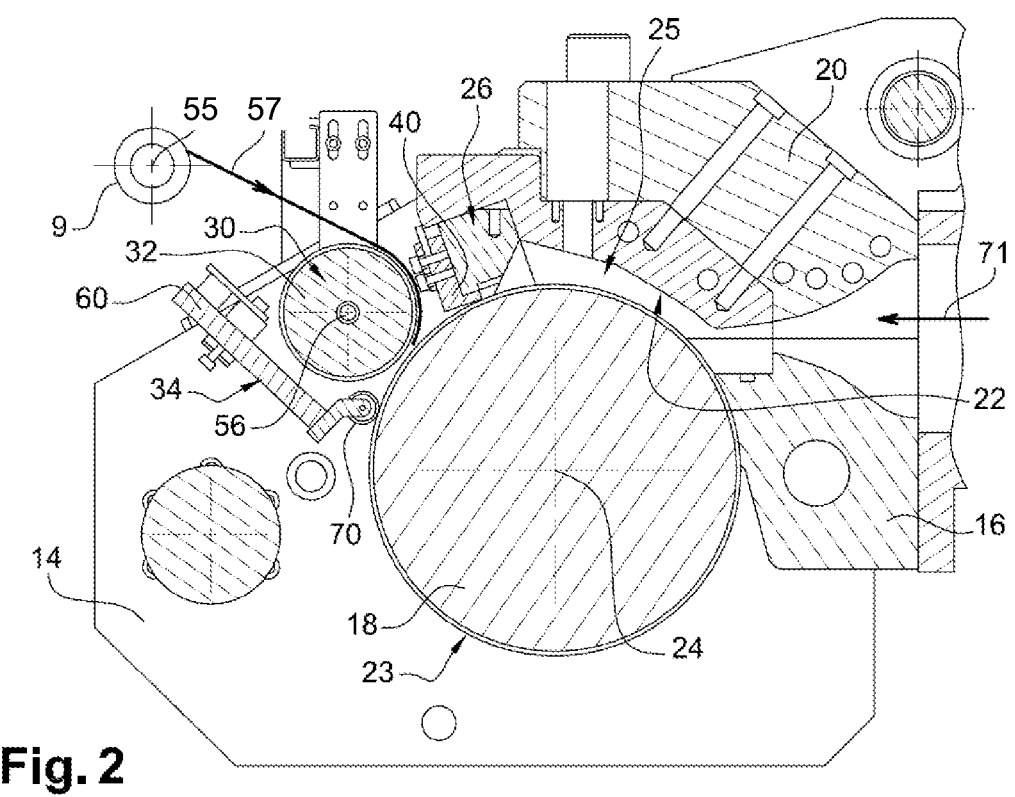

The nose comprises a conduit 16, illustrated in particular in the right-hand part of FIG. 2 and used to introduce the rubber intended to be extruded to form the body. The nose 10 comprises a cylinder or roll 18 positioned at the downstream mouth of the conduit 16 and exhibiting a cylindrical peripheral face 23 of circular section. The nose additionally comprises an assembly of parts 20 forming an arch 22 which delimits, with the face 23, a chamber 25 for pressurizing the material to be extruded, in which the conduit 16 emerges. The parts 20 are rigidly attached to the frame 12, whereas the roll 18 is fitted rotationally mobile, with respect to the uprights 14 around its horizontal axis 24, in the anticlockwise direction in FIG. 2. The nose 10 comprises a profiled blade 26 extending downstream from the chamber 25 and facing the face 23 of the roll. Downstream of the blade, the nose comprises an assembly 30 having small fitting wheels 32 used to introduce the cords into the furrows produced beforehand, and also an stitching assembly 34 used to close the furrows over the cords thus positioned.

With reference to FIGS. 3 and 4, the profiled blade 26 comprises a main body 28 of elongated shape from one to the other of the uprights 14 and rigidly attached to these. The body 28 has a lower face 36 exhibiting cavities and protrusions and intended to give its form to the upper face 6 of the tread by the effect of passing the rubber between this face 36 and the face 23 of the roll. These two elements thus form an extrusion orifice which confers its form on the section of the tread 4 during the passage of the material.

The blade 26 additionally comprises a support 38 carrying ploughshares 40, the number of which equals that of the cords 8 which the tread is intended to receive, in the case in point five. As illustrated in particular in FIG. 2, each of the ploughshares 40 exhibits an "L" general shape, the longer part of the "L" extending in a direction close to the vertical direction and close to the direction radial to the axis 24, and being inserted into a dedicated orifice of the support 38 in which it is fitted so as to be able to move by sliding along this direction.

The blade 26 comprises, for each ploughshare 40, means for rigidly attaching to the body 28, which means are formed, in the case in point, for each ploughshare by two attachment screws 42 which pass through a part of the support and tighten the ploughshare against an internal face of the support. This arrangement makes it possible to adjust the position of the ploughshare with respect to the body 28 along the abovementioned direction and thus to adjust the depth of the furrow 44 produced by the corresponding ploughshare in the tread 4, for example depending on the model of pneumatic tire being manufactured.

The furrows 44 themselves are generated by the penetration of the base or small side of the "L" of each ploughshare 40 into the extruded material forming the rubber tread. The furrows are generated by the fact that the base of each ploughshare projects from the face 36 of the body 28 or more specifically from certain regions of this face, as illustrated in FIG. 4. The small side of the "L" is oriented so that the ploughshare penetrates under the profiled part of the extrusion blade. This particular setup makes it possible to position the upstream part of the ploughshare in a region where the pressure within the tread is not yet zero, which makes it possible to facilitate the penetration of the ploughshare into the material of the tread and the quality of the molding.

The face 36 exhibits at right angles with each ploughshare a cavity 45 extending beyond the ploughshare on each side of the latter. Each of these cavities makes it possible to form, on either side of the furrow, respective protruding beads 46 forming surpluses of rubber projecting from the main part of the face 6. Each furrow 44 thus extends between the two associated beads 46 which are contiguous with it.

As the number of furrows is equal to five in the case in point, ten beads are present. The furrows 44 are intended to receive the cords and then to be filled in, as will be seen later.

The face 36 is also configured in order to form furrows 50, in the case in point three in number, intended to visibly persist on the tread and on the final pneumatic tire, in contrast to the furrows 44. All the abovementioned furrows extend parallel to one another and in the longitudinal direction of the tread 4.

As illustrated in FIG. 6, the blade 26 additionally carries, in the case in point, two devices 52 forming knives for debarring the material in order to delimit the two opposite side edges of the tread. These devices are positioned facing one another, on either side of the support 38.

The extrusion machine comprises means 55 for receiving spools 9 on which the respective cords are wound. These means are arranged so as to allow the spools to unwind as the manufacturing operation proceeds.

The stitching assembly 30 (see FIGS. 6, 9 and 10) comprises small wheels 32 which are equal in number, in the case in point, to that of the cords, namely five in number. The small wheels are identical to one another and are mounted coaxially to one another around a horizontal axis 56. They extend facing the blade 26 so that a path 57 of the cords coming from the spools 9 passes between the assembly 30 and the blade 26 before they are inserted in the tread. During this path, the cords are supported against the circumferential peripheral edge of the respective small wheels 32. Each small wheel thus acts to guide the corresponding cord as far as the bottom of the furrow in order to deposit it therein, the small wheel for this purpose penetrating inside the corresponding furrow.

The small wheels 32 are mounted on a common gantry attached to the frame, the vertical position of which is adjustable in order to cause the small wheels to penetrate more or less deeply into the furrows and thus to insert the corresponding cords more or less into the latter. In the case in point, no motorized drive is provided for the small wheels 32, the latter being driven in rotation by the forward progression of the tread and of the cords inserted into this tread at the same peripheral speed as the latter. It is possible to provide an intermediate guiding part, such as a tube, traversed along its axis by the cords in order to guide them from the spools 9 as far as the assembly 30.

Figure 7:
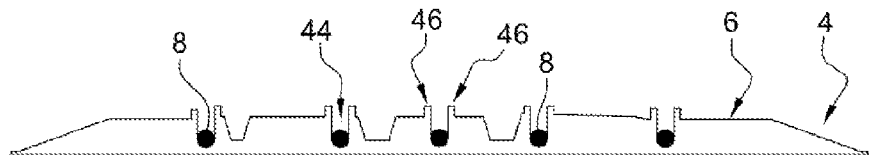
FIGS. 7 and 8 are two views analogous to FIG. 5 showing the cords introduced into the furrows on two treads of different pneumatic tires.
Figure 8:
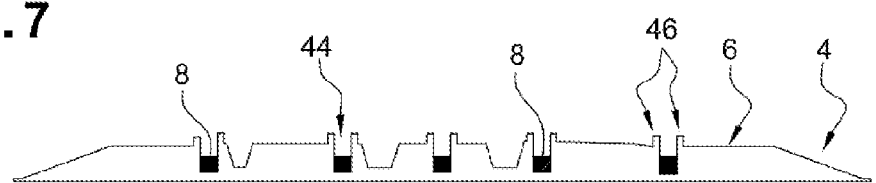
Figure 9:
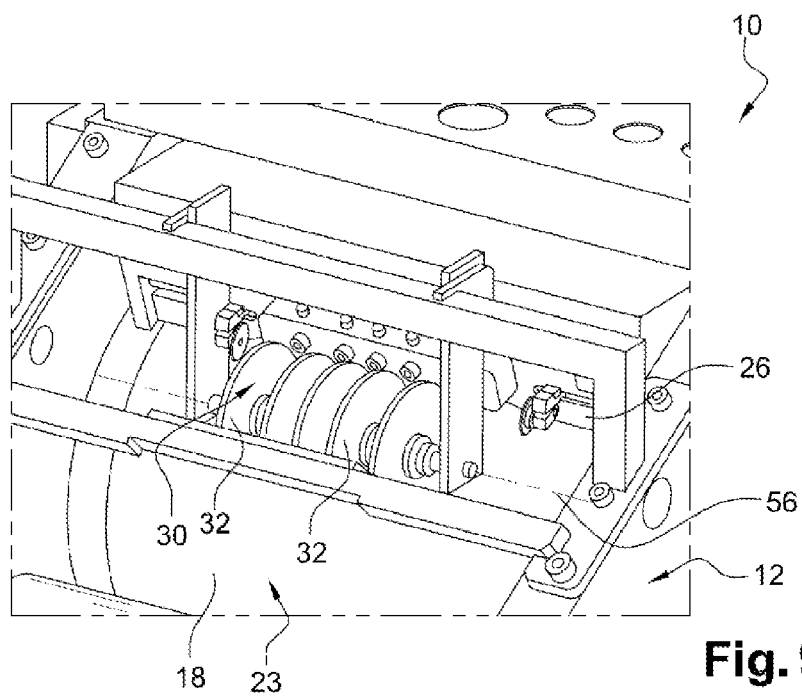
FIG. 9 is a view analogous to FIG. 6 showing the devices for guiding the cords into the furrows on the machine.
Figure 10:
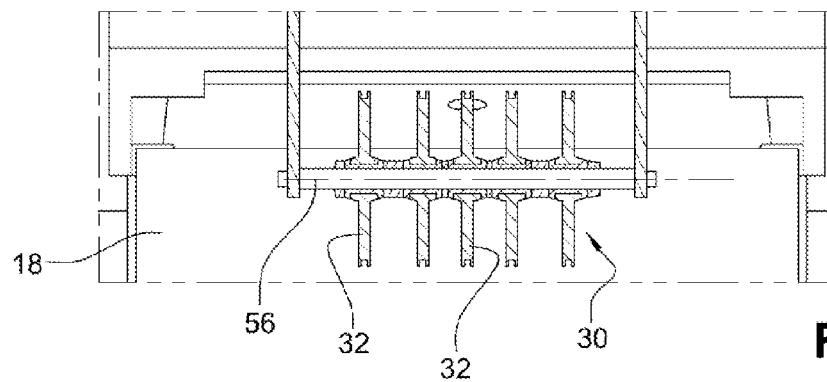
FIG. 10 is a front view of the part of the machine illustrated in FIG. 9.

FIG. 7 illustrates the tread 4 with its open furrows 44, at the bottom of which the composite cords 8 have been deposited. This figure concerns cords having a circular cross section with a diameter of approximately 4 millimeters. FIG. 8 analogously illustrates the case of a tread 4, in the furrows 44 of which are positioned composite cords 8 exhibiting a cross section of parallelepipedal shape, for example square shape with a side length of 4 millimeters.

With reference to FIGS. 2 and 11 to 14, the stitching assembly 34 comprises stitching devices, the number of which is equal to that of the cords, namely five in the case in point. One of these devices 60 has been illustrated in FIG. 14. The assembly 34 comprises a support 62 rigidly attached to the uprights 14 and extending from one to the other of these. Each of the devices 60 comprises a strut 64 of profiled form, received in a corresponding female orifice of the support 62 while being able to move by sliding in the latter along its longitudinal direction, which is similar to the direction radial to the axis 24. The assembly 34 comprises, for each device, a tightening element 66 which passes through the wall of the support 62 in order to tighten the strut 64 against an internal face of the support and thus to rigidly immobilize the device 60 with respect to the support 62 in the chosen position of adjustment.

Figure 11:
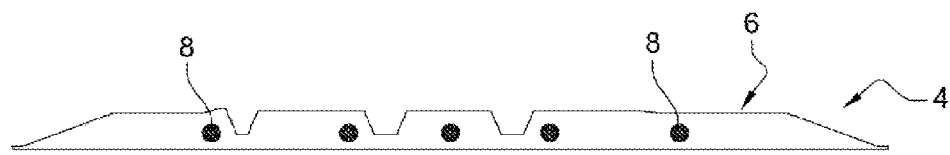
FIGS. 11 and 12 are views analogous to FIGS. 7 and 8 showing the section of the tread when the furrows are closed.
Figure 12:
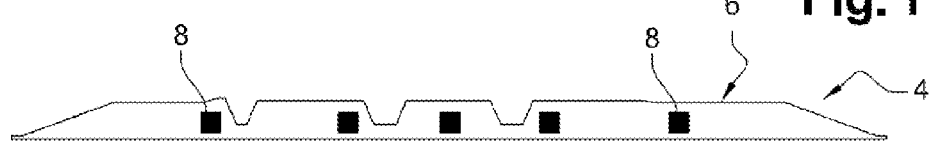
Figure 13:
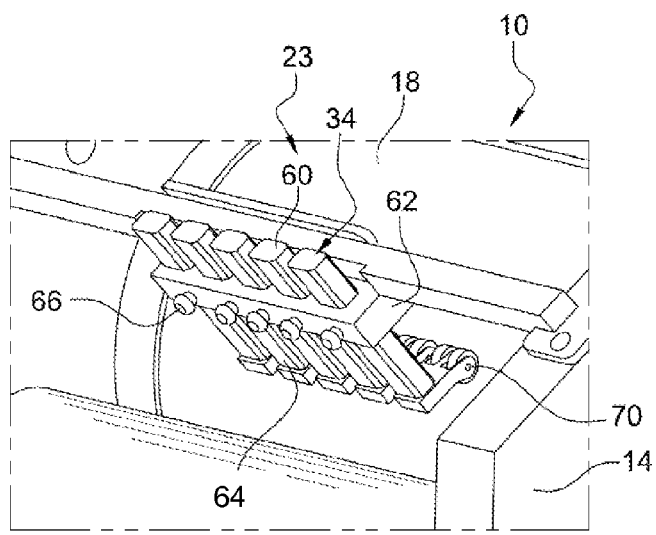
FIG. 13 is a view analogous to FIG. 9 showing the filling devices of the machine of FIG. 1.
Figure 14:
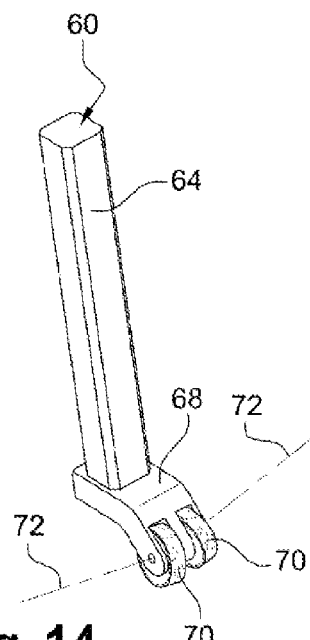
FIG. 14 is a view in perspective of one of these devices.

Each device 60 comprises, at a lower end of the strut, an arm 68 carrying two small toothed wheels 70 mounted in rotating fashion on the arm via respective axes of rotation 72 which are coplanar but intersecting and arranged so that the small wheels have an open configuration towards the upstream side with reference to the direction of forward progression of the tread. The small wheels are positioned so as to be supported against the respective beads 46 associated with the furrow under consideration, so as to turn down the to material forming these protrusions into the furrow over the cord 8 for the purpose of filling the furrow 44. The cord is thus buried, covered and embedded in the tread, as illustrated in FIGS. 11 and 12 in the two cases corresponding to the respective FIGS. 7 and 8.

The process for the manufacture of the tread is carried out in the following way by means of this machine. The material forming the rubber is brought into the nose via the conduit 16 according to the arrow 71 and then passes into the chamber 25, where it is pressurized before being extruded through the extrusion orifice formed by the blade 26 and the roll 18. During this operation, which in particular gives the form to the upper face 6 of the tread, the ploughshares 40 produce longitudinal furrows 44 in the face 6 and also two beads 46 situated on either side of each furrow. The ploughshares are present in a rear part in a region of the machine where the pressure is reduced with respect to the pressure prevailing in the chamber 25.

The spools 9 carrying the cords unwind and the cords, guided and supported by the small wheels 32, pass between these and the blade 26 in order to be inserted at the bottom of the respective furrows 44 in the thickness of the tread. The cords unwind from the spools under the effect of the tread being driven along, which also drives the small wheels 32. The spool is not slowed down by any actuator during its movement.

The material forming the tread is still hot and soft at this stage. When the tread passes under the stitching assembly 34, the wheels 70 turn down the material of the beads 46 into the corresponding furrow, thus embedding the associated composite cord in the thickness of the tread. The furrow is thus blocked and filled.

These operations take place successively for each section of tread under consideration. They take place at the same time for the whole of the tread, the treads being manufactured continuously.

Tests

Cords were produced and incorporated in treads of pneumatic tires as described above. The formulations of the rubber core and of the rubber sheath are given in Table 1. The amounts are expressed as parts per 100 parts by weight of elastomer (phr).

TABLE 1

|  | Core C1 | Sheath S1 |
| --- | --- | --- |
| NR (1) | 100 | 100 |
| Filler A (2) | 50 |  |
| Coupling agent (3) | 5 |  |
| Filler B (4) |  | 400 |
| Filler A' (5) |  | 3 |
| Plasticizing oil (6) |  | 50 |
| Antioxidant (7) | 2 | 2 |
| Stearic acid | 2.5 | 2 |
| Zinc oxide (8) | 2.7 | 3 |

TABLE 1-continued

|  | Core C1 | Sheath S1 |
| --- | --- | --- |
| Accelerator (9) | 1.8 | 0.9 |
| Sulphur | 1.8 | 1.5 |

(1) Natural rubber;
(2) Filler A: Zeosil 1165MP silica from Rhodia, HD type;
(3) Coupling agent: TESPT (Si69 from Degussa);
(4) Filler B: chalk, Omya BLS brand from Omya;
(5) Filler A': carbon black N330 (ASTM grade, Degussa);
(6) TDAE oil (Vivatec 500 from Hansen & Rosenthal);
(7) N-(1,3-Dimethylbutyl)-N-phenyl-para-phenylenediamine (Santoflex 6-PPD from Flexsys);
(8) Zinc oxide (industrial grade, Umicore);
(9) N-(Cyclohexyl)-2-benzothiazolesulphenamide (Santocure CBS from Flexsys).

TABLE 2

|  | C1 | S1 |
| --- | --- | --- |
| M10 (MPa) | 4.7 | 4.1 |
| Breaking stress (MPa) | 25.6 | 4.0 |
| Breaking strain (%) | 650 | 680 |

The materials of the sheath S1 and of the core C1 exhibit comparable stiffnesses at low strain (10%) as well as elongations at break which are also comparable. On the other hand, the material of the sheath S1 has a breaking stress which is very markedly lower than that of the material of the core C1. It is this which allows the regrooving cord to be extracted manually without specific tooling.

Pneumatic tires for a heavy duty vehicle of 315/70 R 22.5 size were produced comprising, in circumferential cavities of their tread, U-shaped cords with a similar geometry to the cord 90 of FIG. 19 having a height and width of the order of 8 mm with a sheath with a thickness of approximately 0.8 mm, corresponding to the compositions C1-S1. The sheaths completely surrounded the core of the cords. The cavities were formed in the tread and the cords were introduced into these cavities in the raw form according to the process described above. The cords were positioned at the same level of the tread as the regions intended to be regrooved in the normal fashion with the bottom of the U positioned radially in the most internal fashion.

The same pneumatic tires also comprised, in other similar cavities of the tread, a cord composed only of a rubber mixture similar to that of the sheath of the composite cord according to the invention.

These pneumatic tires were first of all subjected, for 2000 km, to a test on a stressing rolling drum for the tread, where high-load and high-drift rolling operations are alternated with straight-line high-load rolling operations. The tires and their treads resisted well.

The treads of the pneumatic tires were subsequently planed down, that is to say that the tread was machined in order to reduce its thickness until the sheaths of the regrooving cords are revealed. The pneumatic tires were subsequently subjected to behavioral tests on tracks in the dry state and on tracks covered with a thickness of water.

These tests consisted of running operations of a few tens of km at a normal speed of 90 km/h and then at a limiting speed of 125 km/h on a circuit in the dry state. Subsequently, the pneumatic tires were tested on a circuit comprising numerous bends and covered with water in order to confirm whether the water does not detrimentally affect the hold of the cord in the cavity.

During all these tests, the rubber cords according to the invention remained in place in their cavities. Their anchoring was sufficient to prevent any relative movement between the cords and the adjacent material of the tread before and after planing down the treads. The cords were subsequently able to be removed manually without specific tooling and all at once. The grooves thus created in the tread were suitable.

On the other hand, the rubber cords composed only of a similar mixture to that of the sheath of the composite cord according to the invention did not withstand the tests carried out after planing down the tread. Pieces of varied sizes were gradually torn off and others remained caught in their cavities.

The regrooving cords according to the invention thus have the advantage of making possible good control of their geometry before and after the preparation of the pneumatic tire, of restoring a suitable appearance of the pattern after they have been extracted and of having great ease of industrial implementation.

The invention claimed is:

1. A composite cord comprising:
   a rubber core; and
   a rubber sheath surrounding, at least in part, the rubber core,
   wherein a formulation of the rubber core is different from a formulation of the rubber sheath,
   wherein the rubber core includes:
      a diene elastomer, and
      more than 30 phr (parts by weight per hundred parts of elastomer) of a filler A, the filler A including nanoparticles having a weight-average size of less than 500 nm, and
   wherein the rubber sheath includes:
      a diene elastomer,
      from 0 to less than 30 phr of a filler A', the filler A' including nanoparticles having a weight-average size of less than 500 nm, and
      more than 70 phr of a filler B, the filler B including microparticles having a weight-median size of greater than 1 µm.

2. The composite cord according to claim 1, wherein each diene elastomer is selected from a group of elastomers consisting of: polybutadienes, natural rubbers, synthetic polyisoprenes, butadiene copolymers, isoprene copolymers, and mixtures thereof.

3. The composite cord according to claim 1, wherein the filler A or the filler A' includes carbon black.

4. The composite cord according to claim 1, wherein the filler A or the filler A' includes an inorganic filler.

5. The composite cord according to claim 4, wherein the inorganic filler is silica.

6. The composite cord according to claim 1, wherein an amount of the filler A' in the rubber sheath is less than 10 phr.

7. The composite cord according to claim 6, wherein the amount of the filler A' in the rubber sheath is between 2 and 5 phr.

8. The composite cord according to claim 1, wherein an amount of the filler B in the rubber sheath is greater than 100 phr.

9. The composite cord according to claim 8, wherein the amount of the filler B in the rubber sheath is between 200 and 600 phr.

10. The composite cord according to claim 1, wherein the filler B has a median particle size of between 1 and 200 µm.

11. The composite cord according to claim 10, wherein the filler B has a median particle size of between 5 and 100 µm.

12. The composite cord according to claim 1, wherein the filler B is selected from a group of compounds consisting of: chalk, synthetic calcium carbonates, kaolin, and mixtures thereof.

13. The composite cord according to claim 1, wherein a greatest dimension of the composite cord in any cross section is between 3 and 20 mm.

14. The composite cord according to claim 13, wherein the greatest dimension of the composite cord in any cross section is between 5 and 15 mm.

15. The composite cord according to claim 1, wherein a thickness of the rubber sheath is between 0.3 and 1.5 mm.

16. The composite cord according to claim 15, wherein the thickness of the rubber sheath is between 0.5 and 1.0 mm.

17. The composite cord according to claim 1, further comprising a vulcanization system, wherein the composite cord is non-vulcanized.

18. The composite cord according to claim 1, further comprising a vulcanization system, wherein the composite cord is prevulcanized.

19. The composite cord according to claim 1, wherein the rubber sheath covers more than 50% of an external surface of the rubber core.

20. The composite cord according to claim 1, wherein the rubber sheath has an open torus shape.

21. The composite cord according to claim 20, wherein the composite cord has a U-shaped outline having two branches, such that the rubber sheath is positioned along the two branches and at a bottom portion of the U-shaped outline.

22. The composite cord according to claim 20, wherein the composite cord has a substantially circular cross-sectional outline.

23. The composite cord according to claim 1, wherein the composite cord has a square-shaped or a rectangular-shaped cross-sectional outline, such that the rubber sheath is positioned along three sides of the outline.

24. The composite cord according to claim 1, wherein the rubber sheath includes two unconnected parts.

25. The composite cord according to claim 24, wherein the composite cord has a square-shaped or a rectangular-shaped cross-sectional outline or a U-shaped cross-sectional outline, such that the rubber sheath is positioned along two opposite sides of the square-shaped or the rectuangular-shaped outline or along two branches of the U-shaped outline.

26. The composite cord according to claim 24, wherein the composite cord has a substantially circular cross-sectional outline.

27. The composite cord according to claim 1, wherein the rubber sheath includes axial discontinuities.

28. The composite cord according to claim 1,
   wherein the composite cord is incorporated in a tire that is pneumatic or nonpneumatic,
   wherein the tire includes a crown with a crown reinforcement and a tread, and
   wherein the composite cord is positioned in at least one internal circumferential cavity of the tread.

29. The composite cord according to claim 1, wherein the composite cord is incorporated in a pneumatic tire or a non-pneumatic tire as a regrooving cord.

* * * * *